United States Patent
Busch

(10) Patent No.: US 10,021,884 B2
(45) Date of Patent: Jul. 17, 2018

(54) VENT CUTTER AND METHOD FOR CUTTING LOOSE TISSUE AROUND A VENT OF POULTRY

(71) Applicant: Meyn Food Processing Technology B.V.

(72) Inventor: Cornelis Busch, Oostzaan (NL)

(73) Assignee: MEYN FOOD PROCESSING TECHNOLOGY B.V., Oostzaan (NL)

( * ) Notice: Subject to any disclaimer, the term of this patent is extended or adjusted under 35 U.S.C. 154(b) by 0 days.

(21) Appl. No.: 15/831,441

(22) Filed: Dec. 5, 2017

(65) Prior Publication Data

US 2018/0160690 A1    Jun. 14, 2018

(30) Foreign Application Priority Data

Dec. 14, 2016  (NL) .................................... 2017997

(51) Int. Cl.
*A22B 5/00* (2006.01)
*A22C 21/06* (2006.01)
*A22C 21/00* (2006.01)

(52) U.S. Cl.
CPC ............ *A22B 5/0094* (2013.01); *A22C 21/06* (2013.01); *A22C 21/0023* (2013.01)

(58) Field of Classification Search
CPC .......... A22B 5/00; A22B 5/0005; A22C 21/06
USPC ........................................................ 452/120
See application file for complete search history.

(56) References Cited

U.S. PATENT DOCUMENTS

| | | | |
|---|---|---|---|
| 4,023,237 A | | 5/1977 | Meyn |
| 4,418,415 A | * | 11/1983 | Raymond ................ H05B 3/66 219/531 |
| 4,486,920 A | * | 12/1984 | Tieleman ............... A22C 21/06 452/109 |
| 4,704,768 A | * | 11/1987 | Hutting .................. A22C 21/06 452/106 |
| 4,731,907 A | * | 3/1988 | Tieleman ............... A22C 21/06 452/120 |
| 4,876,767 A | * | 10/1989 | Harben, III ........ A22C 21/0061 452/106 |
| 5,123,871 A | | 6/1992 | van den Nieuwwelaar |
| 5,133,686 A | | 7/1992 | van den Nieuwwelaar |
| 5,741,176 A | | 4/1998 | Lapp |
| 5,816,904 A | * | 10/1998 | Tieleman ............... A22C 21/06 452/120 |

(Continued)

FOREIGN PATENT DOCUMENTS

| | | |
|---|---|---|
| EP | 1064848 | 1/2001 |
| WO | WO 9941990 | 8/1999 |

OTHER PUBLICATIONS

PCT Search Report re: NL2017997 dated Jul. 31, 2017.

*Primary Examiner* — Richard Thomas Price, Jr.
(74) *Attorney, Agent, or Firm* — Dorrity & Manning, P.A.

(57) ABSTRACT

Vent cutter including a rotatable cutter with forward cutting edge for cutting tissue around a vent of poultry. A centering pin can be inside the cutter with a thickened end portion for insertion into the vent prior to cutting. A clamping sleeve can be inside of the cutter and surround the centering pin. The centering pin and the clamping sleeve can be movable with respect to each other and arranged to cooperate for clamping tissue of the poultry. The clamping sleeve can be movable with respect to the cutter.

6 Claims, 10 Drawing Sheets

(56) References Cited

U.S. PATENT DOCUMENTS 6,213,864 B1 * 4/2001 Griffiths .............. A22B 5/0094
452/116
6,398,636 B1 * 6/2002 Jansen ................ A22B 5/0094
452/120

* cited by examiner

VENT CUTTER AND METHOD FOR CUTTING LOOSE TISSUE AROUND A VENT OF POULTRY

PRIORITY STATEMENT

The present application claims priority under 35 U.S.C. § 119 to Dutch Application No. 2017997, filed Dec. 14, 2016.

FIELD OF THE INVENTION

The subject matter of the present disclosure relates generally to a vent cutting for poultry.

BACKGROUND OF THE INVENTION

In EP 1 064 848, the tissue surrounding a vent of poultry is cut loose in a method that can include introducing the centering pin with the second end portion into the vent, rotating the cutter for cutting loose the tissue surrounding the vent, and advancing the clamping sleeve for clamping the cut loose tissue between the clamping sleeve and the thickened end portion of the centering pin, and retracting the centering pin and the clamping sleeve while clamping said tissue for severing the vent from the poultry. In this known method and vent cutter, the centering pin and the clamping sleeve are rotationally fixed as opposed to the rotatable cutter. The cutter can be rotated and advanced to the poultry's tissue for performing a cutting operation on the tissue. Apart from the forward cutting edge of the rotary cutter, the rotary cutter is usually also provided with slits in its circular wall that act on the tissue of the poultry during rotation of the cutter. Further, the clamping sleeve and the cutter of the known vent cutter are in a fixed longitudinal position in relation to each other, which means that when moving the cutter, the clamping sleeve moves in unison with the cutter.

SUMMARY OF THE INVENTION

In one exemplary aspect, the invention relates to a vent cutter including a rotatable cutter with at least a forward cutting edge for cutting tissue around a vent of poultry. A centering pin can be inside the cutter with a thickened end portion for insertion into the vent prior to cutting. A clamping sleeve can be provided inside of the cutter and surrounding the centering pin, wherein the centering pin and the clamping sleeve may be movable with respect to each other and arranged to cooperate for clamping tissue of the poultry which the cutter has cut loose. Additional aspects and advantages of the invention will be set forth in part in the following description, or may be obvious from the description, or may be learned through practice of the invention.

In one exemplary aspect of the invention, the clamping sleeve is movable with respect to the cutter in accordance with the features set forth herein. This movability of the clamping sleeve with respect to the cutter enables it to selectively shield the cutter from (further) contacting tissue of the poultry. According to this exemplary aspect of the invention, this provides the possibility that the cutter first cuts loose the tissue around the vent of the poultry and that thereafter, during advancing the clamping sleeve, the clamping sleeve can be moved to a position in which it shields the vent cutter from further cutting the poultry's tissue. Accordingly, this exemplary aspect of the invention can secure against damaging the entrails of the poultry that might otherwise contaminate the poultry with the content of the entrails.

To promote the benefits of exemplary aspect of the invention, in one exemplary embodiment, during advancing the clamping sleeve it is moved to a position beyond a forward cutting edge of the vent cutter. The clamping sleeve can be longitudinally movable with respect to the cutter so as to enable it to move beyond the forward cutting edge of the cutter. The forward cutting edge of the cutter can then be shielded by the clamping sleeve from further contacting the tissue of the poultry, that is to say after the cutter has cut loose the tissue surrounding the vent of the poultry.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

Figure 1:
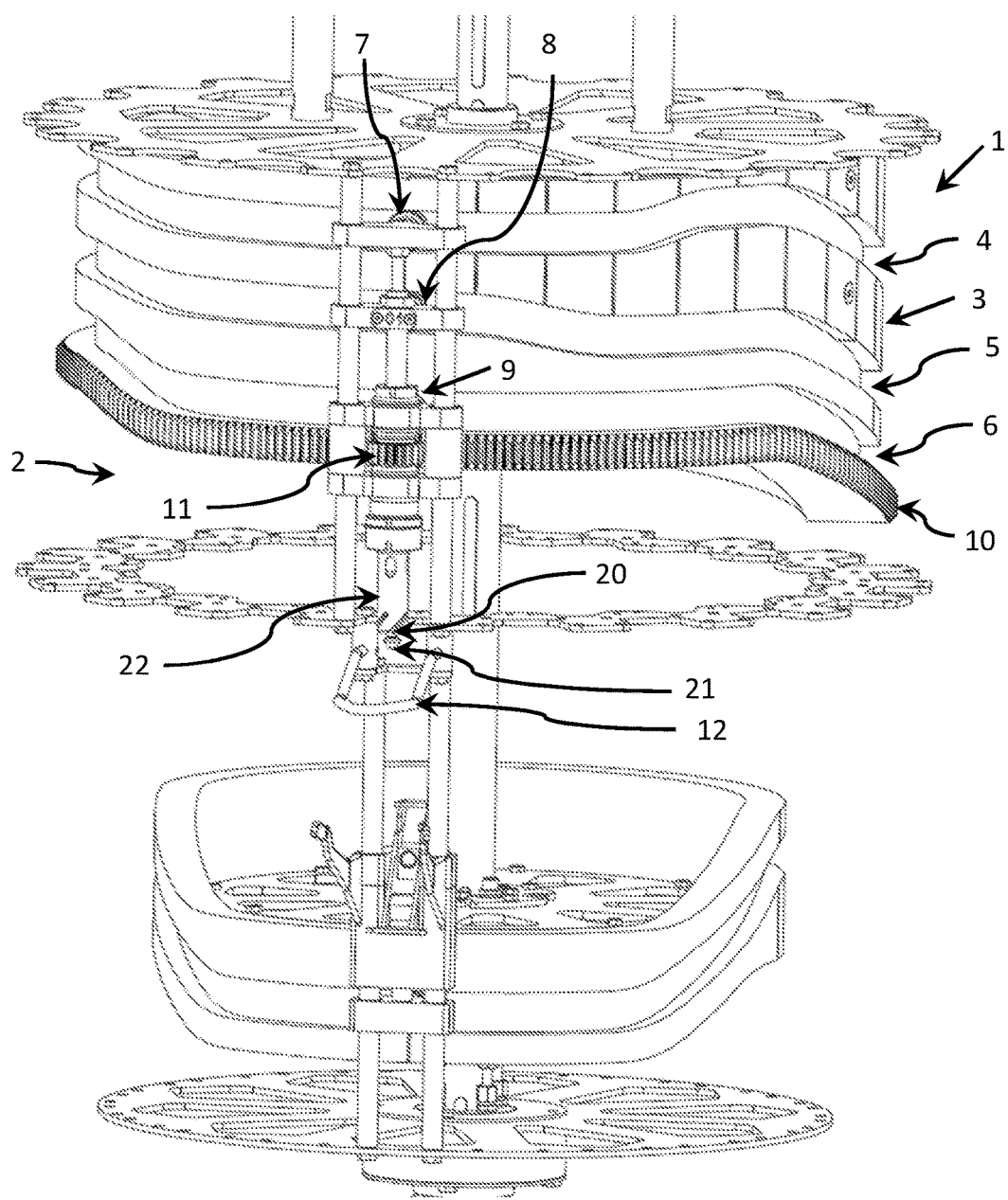
FIG. 1 shows a schematic impression of an apparatus including a vent cutter according to an exemplary embodiment of the invention.

Making first reference to FIG. 1, an exemplary apparatus 1 is shown in which the exemplary vent cutter 2 can be applied. The apparatus 1 forms part of a poultry processing line and usually includes a drum 3 provided with grooves 4, 5 and 6 in which wheels 7, 8 and 9 are guided to drive the respective parts of the exemplary vent cutter 2 of the invention that are connected to said wheels.

Figure 2:
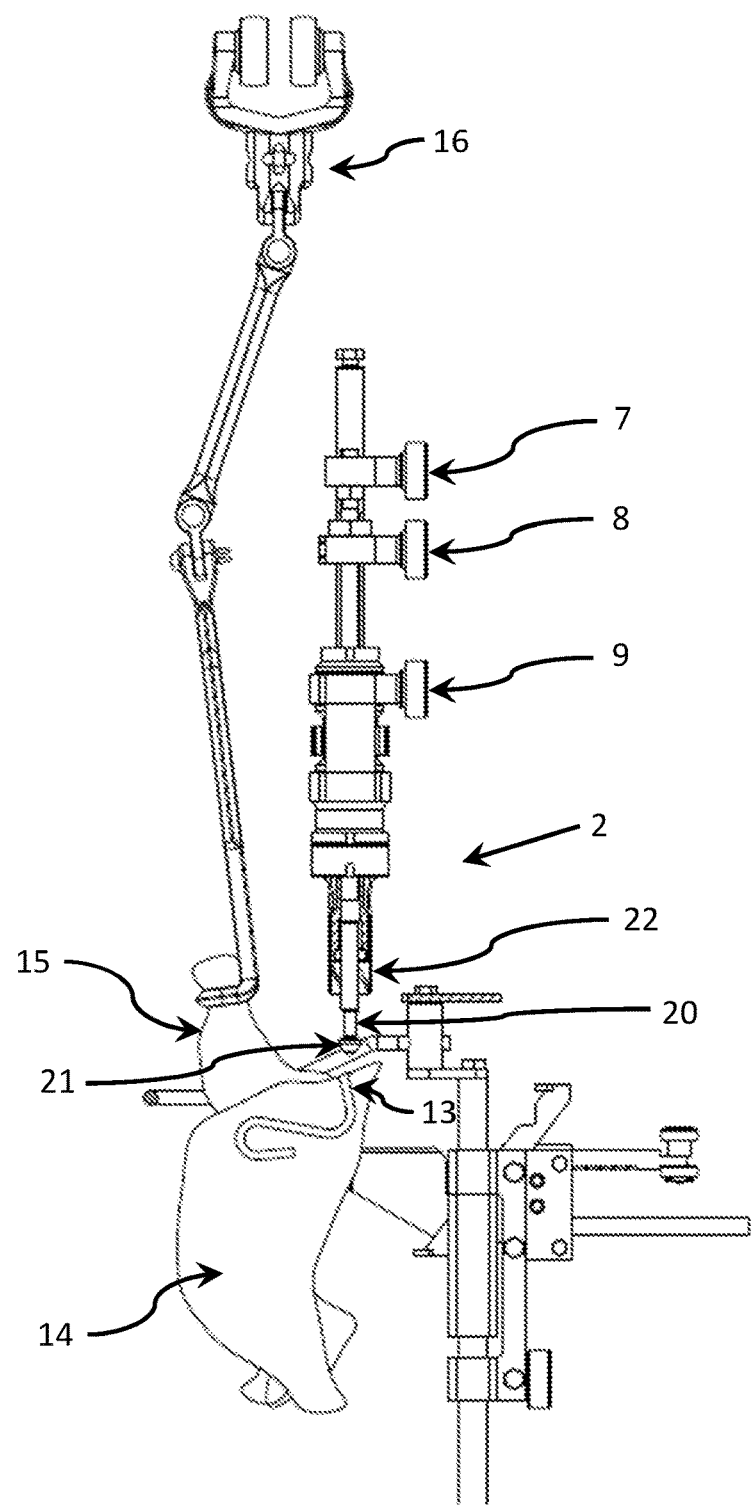
FIG. 2 shows a side view of the vent cutter of an exemplary embodiment of the invention immediately prior to introducing its centering pin into the poultry's vent.

FIG. 2 shows the exemplary embodiment of the vent cutter 2 of the invention in a side view prior to parts of it being introduced into a poultry's vent 13. FIG. 2 also shows that the poultry 14 is suspended by the legs 15 from a trolley 16 which in known way is moved in the poultry processing line of a poultry processing plant around the drum 3 shown in FIG. 1.

Again with reference to FIG. 1, it shows that the grooves 4, 5 and 6 in the drum 3 vary in height so as to effect that the respective parts of the vent cutter 2 that connect to said wheels 7, 8 and 9 are concertedly, albeit in their own phasing, moved up and down so as to introduce said parts into the suspended poultry, and finally retract these parts therefrom in a manner as will be explained hereinafter.

FIG. 1 also shows that the exemplary apparatus 1 is provided with a rack and pinion 10, 11 that during use drives the exemplary vent cutter 2, in that it lets the rotatable cutter 22 of the vent cutter 2 rotate around its longitudinal axis. This rotating action of the cutter 22 arranges that the vent 13 is cut loose from the suspended poultry 14 as will the explained hereinafter. FIG. 1 further shows amongst others a brace 12 which during use is placed between the poultry's legs 15 and is used to fixate the bottom of the poultry 14 during operation of the cutter 22 on the tissue surrounding the poultry's vent 13.

Figure 3:
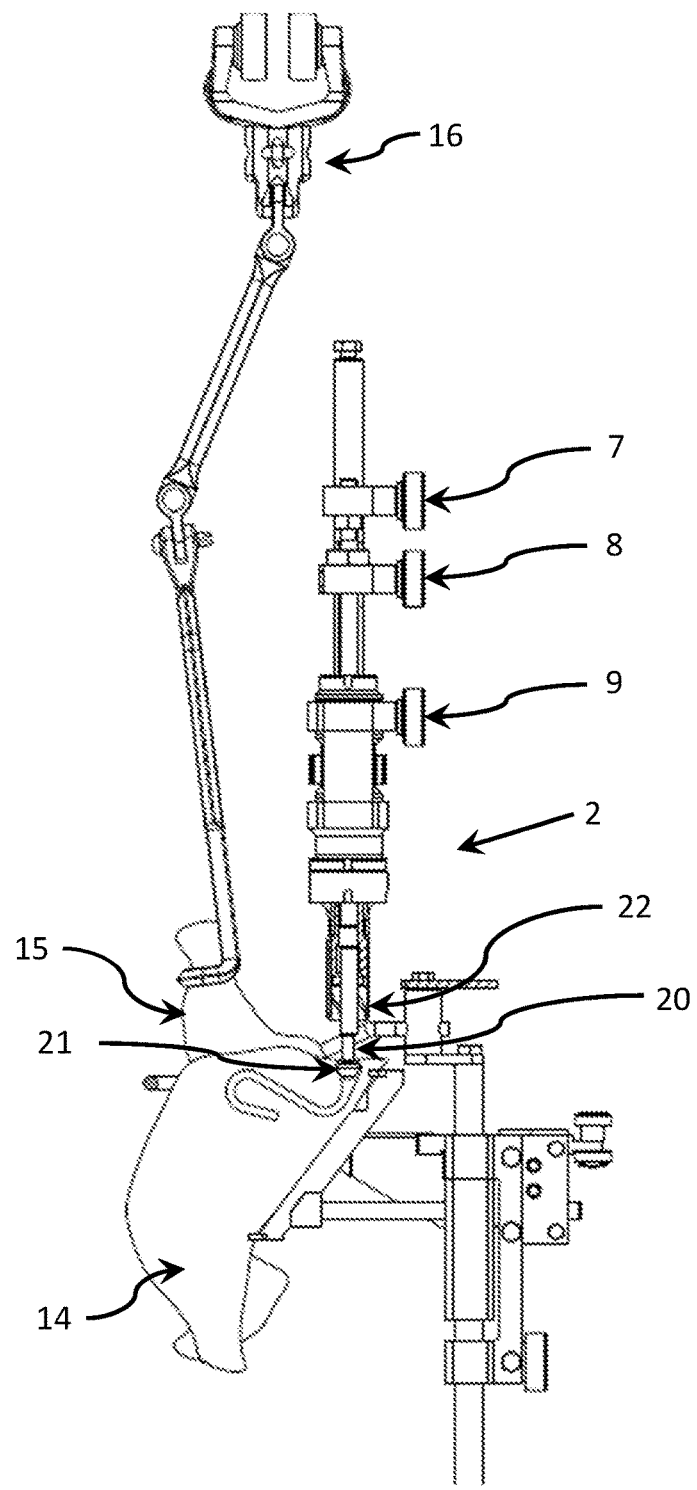
FIGS. 3 and 8 show a side view of an exemplary vent cutter of the invention after introducing the centering pen into the poultry's vent.
Figure 8:
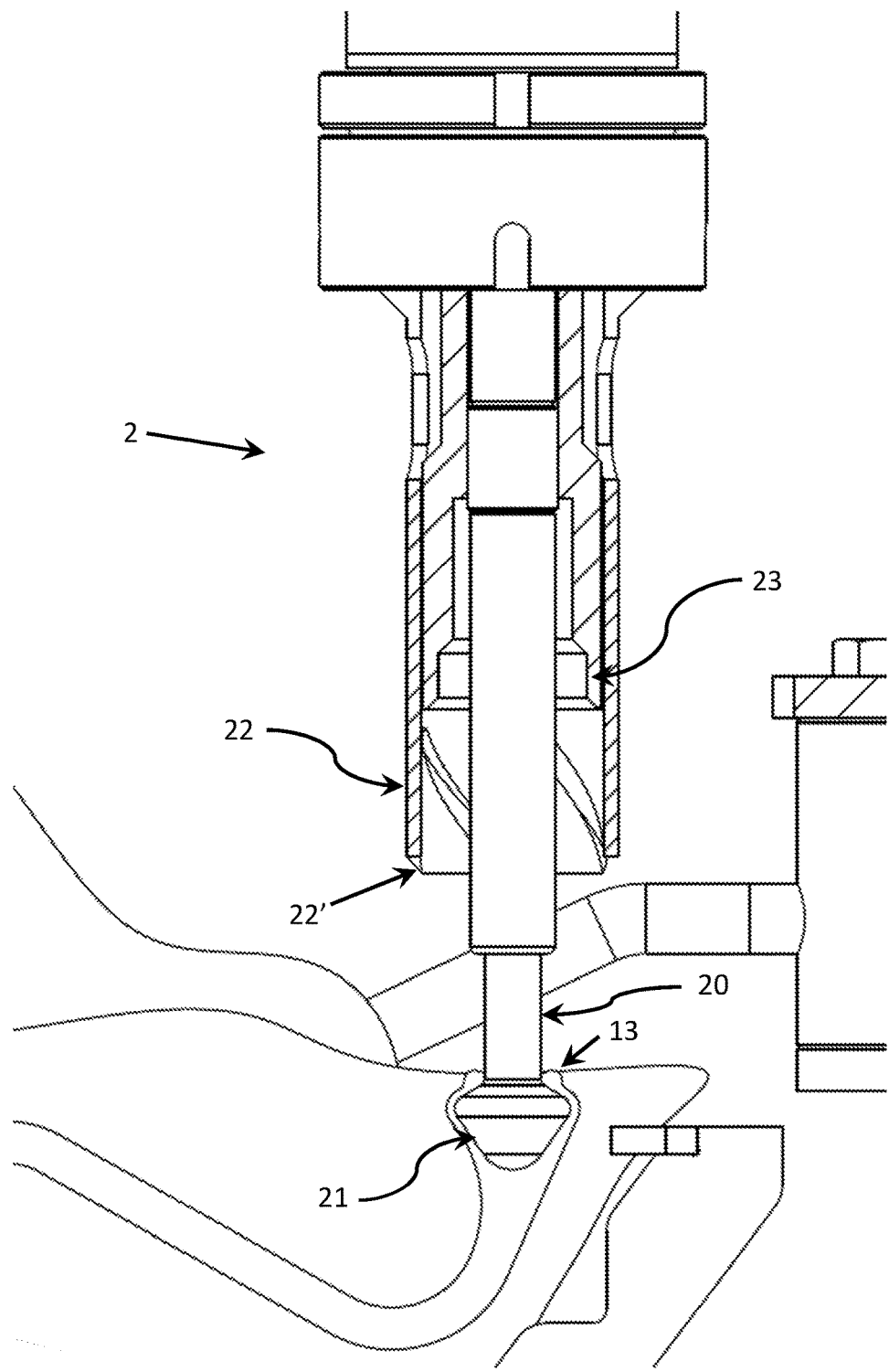

As may be best seen in FIG. 8 which is an enlarged and detailed view corresponding to what is shown in FIG. 3, the vent cutter 2 has a centering pin 20 inside of the cutter 22, which centering pin 20 has a thickened end portion 21. As FIGS. 3 and 8 illustrate, this thickened end portion 21 is introduced into the vent 13, which is done prior to cutting the tissue surrounding the vent 13 with the cutter 22.

The rotatable cutter 22 of the exemplary vent cutter 2 is provided with at least a forward cutting edge 22' which will, after introduction of the thickened end portion 21 into the vent 13, subsequently be used to cut the tissue surrounding the vent 13 of the poultry. There is also a clamping sleeve 23 inside of the cutter 22 which surrounds the centering pin 20. The centering pin 20 and the clamping sleeve 23 are movable with respect to each other and are used to clamp the tissue of the poultry 14 which the cutter 22 has cut loose.

Figure 4:
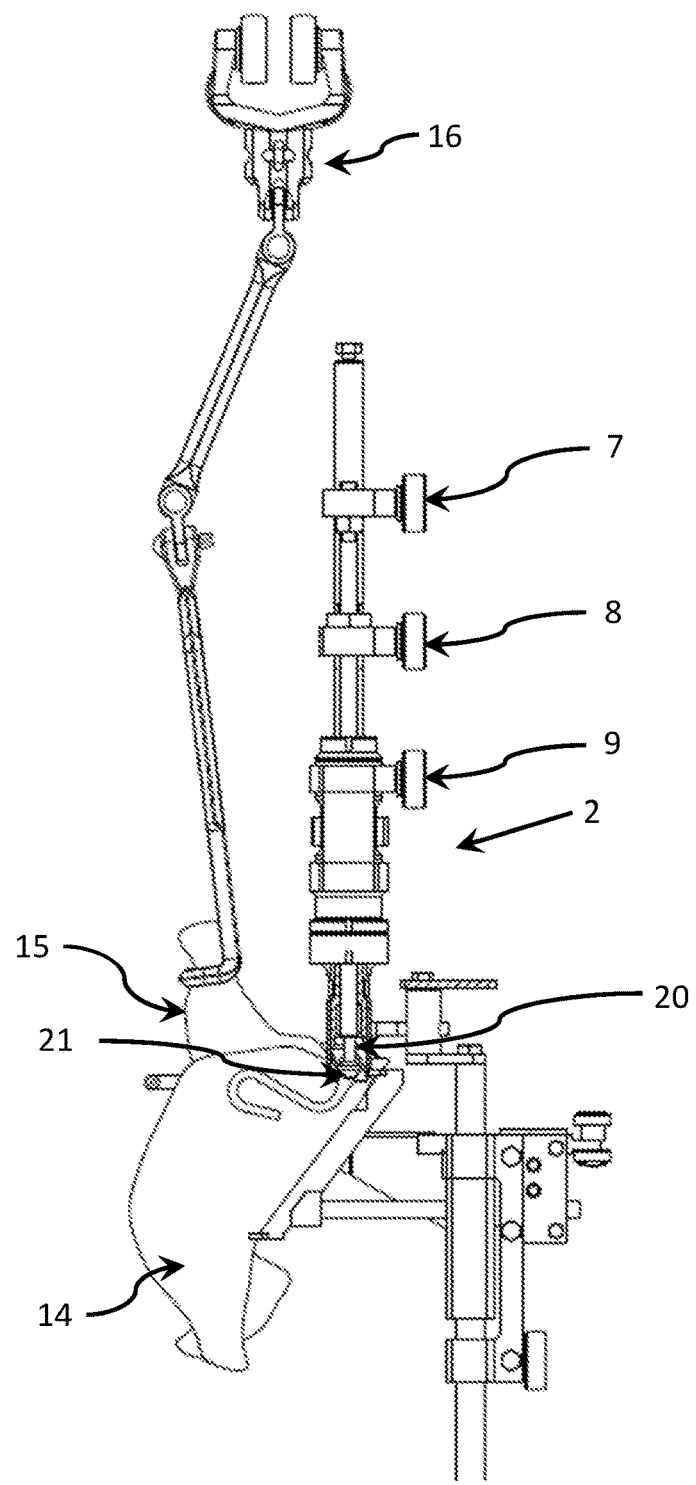
FIGS. 4 and 9 show a side view of an exemplary embodiment of a vent cutter of the invention wherein the cutter is operational.
Figure 9:
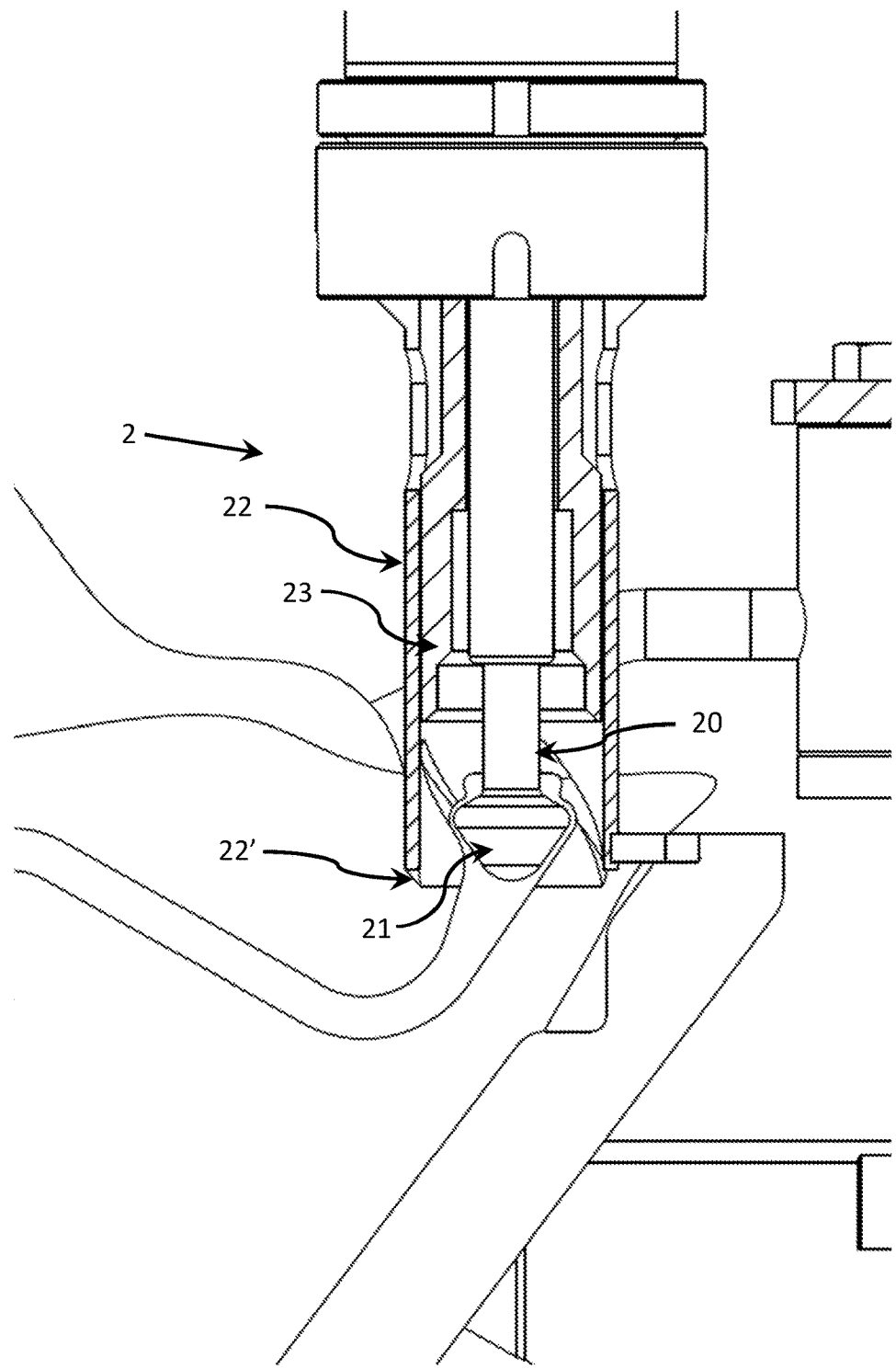

The act of cutting loose of the tissue surrounding the vent 13 can be inferred from what is shown in FIG. 4 and its enlarged view in FIG. 9. In comparing FIGS. 4 and 9 with FIGS. 3 and 8 it is clear that the cutter 22 has progressed in that it is introduced into the poultry 14 whilst the centering pin 20 with the thickened end portion 21 has remained in place of the vent 13 of the suspended poultry 14.

Figure 5:
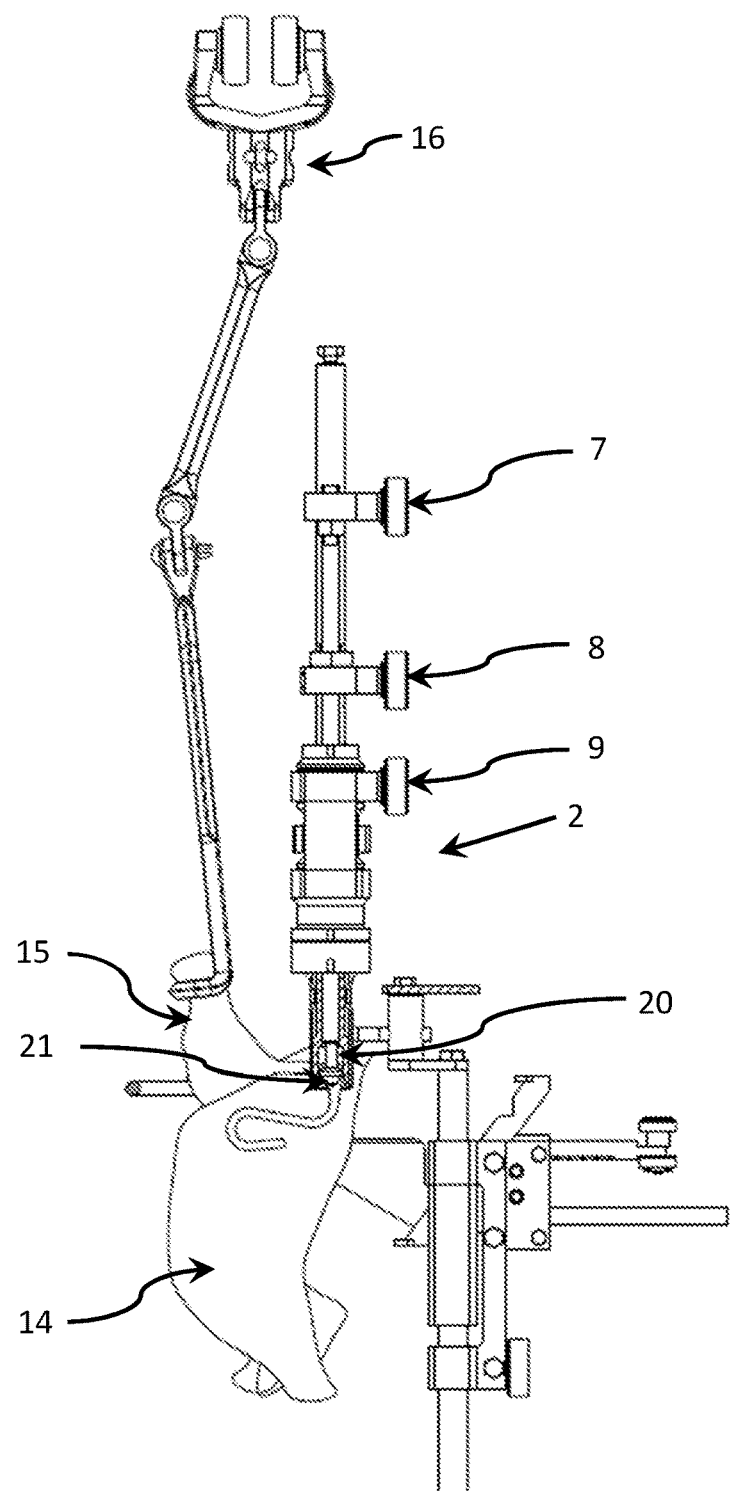
FIGS. 5 and 10 show a side view of the exemplary vent cutter wherein its clamping sleeve is advanced beyond a forward cutting edge of the cutter.
Figure 10:
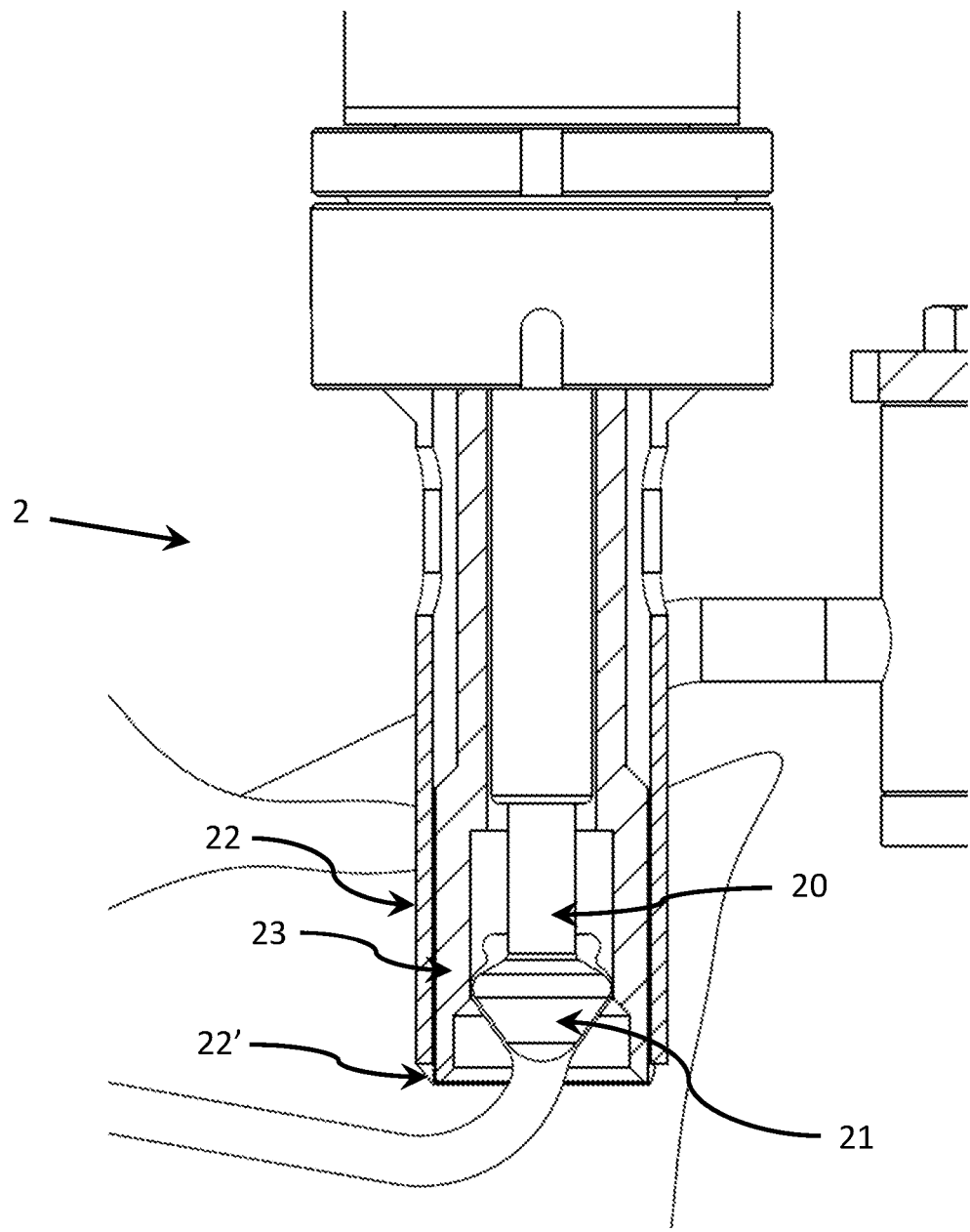

FIG. 5 and its enlarged view of FIG. 10 depict a subsequent situation wherein also the clamping sleeve 23 is advanced and introduced into the poultry, even beyond the cutter 22 and beyond a forward cutting edge 22' of the cutter 22. This occurs after said cutter 22 has cut the tissue surrounding the vent 13. In that situation wherein the vent 13 surrounding tissue has been cut loose, the vent 13 can be clamped between the clamping sleeve 23 and the thickened end portion 21 of the centering pin 20. At the same time the clamping sleeve 23 then shields the cutter 22 from further cutting the poultry's tissue, particularly since the clamping sleeve 23 has progressed beyond the forward cutting edge 22' of the cutter 22.

Figure 6:
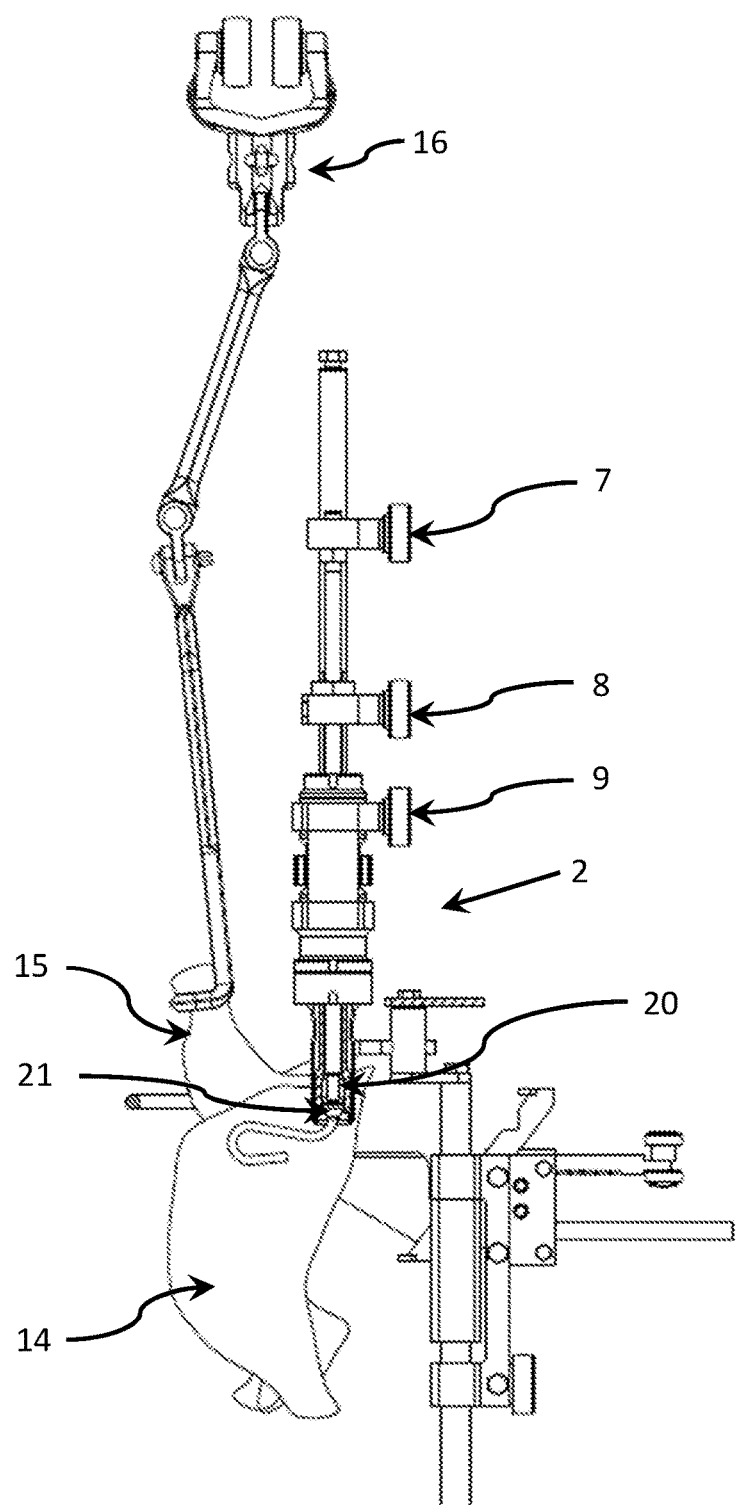
FIG. 6 shows a side view of the exemplary vent cutter after the vent cutter has been further introduced into the poultry.
Figure 7:
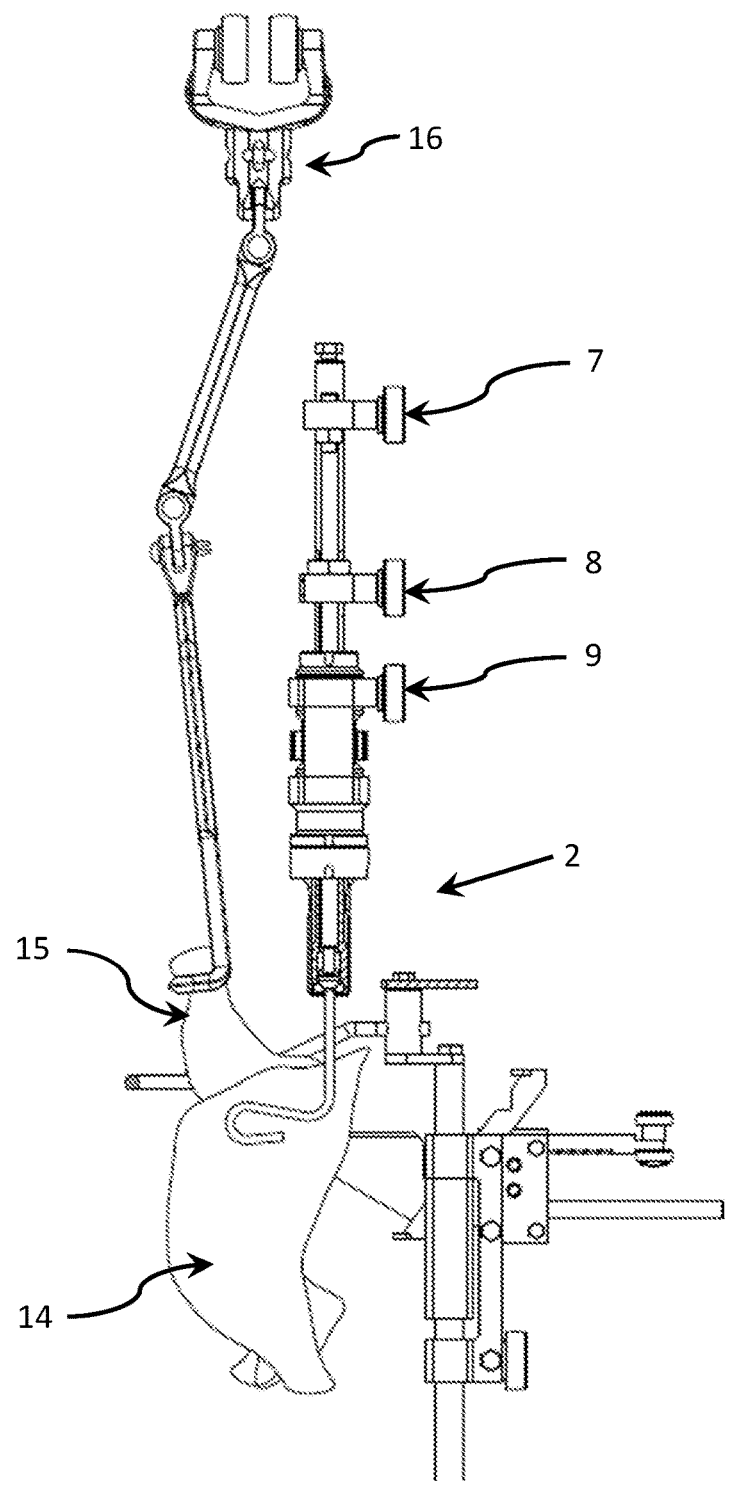
FIG. 7 shows a side view of the exemplary vent cutter after its retraction from the suspended poultry.

After reaching the situation shown in FIGS. 5 and 10 wherein the tissue surrounding the vent 13 has been cut loose and clamped between the clamping sleeve 23 and the thickened end portion 21 of the centering pin 20, these parts, that is to say the clamping sleeve 23 and the thickened end portion 21 of the centering pin 20 are first further introduced into the suspended poultry 14, as is depicted in FIG. 6. Although this further down movement of the clamping sleeve 23 and the thickened end portion 21 of the centering pin 20 is not always required, in particular circumstances it makes sure that the vent 13 will be entirely loose from the remainder of the poultry 14 after completing the cutting operation. Thereafter, FIG. 7 shows that the clamping sleeve 23 and the thickened end portion 21 of the centering pin 20 are retracted from the suspended poultry 14, and take out the cut loose and clamped vent 13 from the suspended poultry 14.

Although the invention has been discussed in the foregoing with reference to an exemplary embodiment of the apparatus of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

What is claimed is:

1. A vent cutter positioned in a processing line, comprising:

wheels that are connected to respective parts of the vent cutter, the wheels guided in grooves to drive the respective parts of the vent cutter up and down;

a rotatable cutter with at least a forward cutting edge for cutting tissue around a vent of poultry, the rotatable cutter drivingly connected to a first wheel;

a centering pin inside the cutter with a thickened end portion for insertion into the vent prior to cutting, the centering pin drivingly connected to a second wheel;

a clamping sleeve inside of the cutter and surrounding the centering pin, the clamping sleeve drivingly connected to a third wheel;

wherein the grooves vary in height so as to effect that the respective parts of the vent cutter that connect to the wheels are concertedly, albeit in their own phasing, movable up-and-down;

wherein the grooves are arranged to first introduce the centering pin with the thickened end portion into the vent, and then to progress the cutter until the cutter is introduced into the poultry and cuts the tissue around the vent while the centering pin with the thickened end portion has remained in place of the vent of the suspended poultry, wherein the grooves are arranged to then advance the clamping sleeve after rotating the cutter for clamping the tissue that was cut between the clamping sleeve and the thickened end portion of the centering pin, wherein the grooves are arranged to then provide that the clamping sleeve is moved to a position with respect to the cutter in which the clamping sleeve shields the vent cutter from further cutting the tissue;

wherein the grooves are arranged to then retract the centering pin and the clamping sleeve while still clamping the tissue.

2. The vent cutter according to claim 1, wherein the clamping sleeve is movable so as to enable it to selectively shield the cutter from contacting tissue of the poultry.

3. The vent cutter according to 1, wherein the clamping sleeve is longitudinally movable with respect to the cutter so as to enable it to move beyond the forward cutting edge of the cutter.

4. The vent cutter according to claim 1, wherein the clamping sleeve is arranged to shield the cutter from further contacting tissue of the poultry after the cutter has cut loose the tissue surrounding the vent of the poultry.

5. A method for cutting loose tissue surrounding a vent of poultry with a vent cutter that includes a rotatable cutter, a centering pin inside the cutter with a thickened end portion, and a clamping sleeve inside of the cutter that surrounds the centering pin, the method comprising introducing the centering pin with the thickened end portion into the vent;

rotating the cutter for cutting loose the tissue surrounding the vent, and advancing the clamping sleeve for clamping the cut loose tissue between the clamping sleeve and the thickened end portion of the centering pin, and retracting the centering pin and the clamping sleeve while clamping the tissue for severing the vent from the poultry, wherein during the advancing the clamping sleeve is moved to a position in which the clamping sleeve shields the vent cutter from further cutting the poultry's tissue.

6. The method according to claim 5, wherein during advancing the clamping sleeve it is moved to a position beyond a forward cutting edge of the vent cutter.

* * * * *